(12) United States Patent
Lok et al.

(10) Patent No.: US 9,025,533 B1
(45) Date of Patent: May 5, 2015

(54) SYSTEM AND METHOD FOR DYNAMIC VLAN ASSIGNMENT

(71) Applicant: RG Nets, Inc., Reno, NV (US)

(72) Inventors: Simon C. Lok, Howard Beach, NY (US); Nicholas C. Rogers, Palm Beach Gardens, FL (US); Darrian Hale, Reno, NV (US)

(73) Assignee: RG Nets, Inc., Reno, NV (US)

( * ) Notice: Subject to any disclaimer, the term of this patent is extended or adjusted under 35 U.S.C. 154(b) by 0 days.

(21) Appl. No.: 14/500,011

(22) Filed: Sep. 29, 2014

(51) Int. Cl.
  *H04W 4/00* (2009.01)
  *H04L 12/46* (2006.01)
  *H04L 29/12* (2006.01)

(52) U.S. Cl.
  CPC ........ *H04L 12/4679* (2013.01); *H04L 61/2015* (2013.01)

(58) Field of Classification Search
  USPC .................. 370/254, 328, 338, 389, 401, 465
  See application file for complete search history.

(56) References Cited

U.S. PATENT DOCUMENTS

| | | | |
|---|---|---|---|
| 6,539,019 B1 | 3/2003 | Noy et al. | |
| 7,379,443 B2 | 5/2008 | Ahuja et al. | |
| 7,447,188 B1* | 11/2008 | Dommety et al. | 370/342 |
| 7,492,766 B2 | 2/2009 | Cabeca et al. | |
| 7,606,232 B1 | 10/2009 | Ruben et al. | |
| 7,636,360 B2 | 12/2009 | Nagai et al. | |
| 7,688,829 B2 | 3/2010 | Guichard et al. | |
| 7,693,158 B1 | 4/2010 | Carrie | |
| 7,944,918 B2 | 5/2011 | Cabeca et al. | |
| 7,983,258 B1 | 7/2011 | Ruben et al. | |
| 8,537,716 B2 | 9/2013 | Gudipudi et al. | |
| 2006/0274744 A1* | 12/2006 | Nagai et al. | 370/389 |
| 2007/0071012 A1* | 3/2007 | Park et al. | 370/395.53 |
| 2011/0222439 A1* | 9/2011 | Long | 370/255 |

* cited by examiner

*Primary Examiner* — Ricky Ngo
*Assistant Examiner* — Christine Ng
(74) *Attorney, Agent, or Firm* — Cislo & Thomas, LLP

(57) ABSTRACT

A system and method for dynamically assigning VLANs to devices for reliable, high performance and low support volume mechanism that allows service providers to affordably deploy dynamic per-unit VLAN assignment with zero operator intervention provisioning.

20 Claims, 5 Drawing Sheets

| 400 | | | | |
|---|---|---|---|---|
| VLAN 402 | DEVICE 404 | ACCOUNT 406 | PROPERTY 408 | |
| 2000 | aa:bb:cc:dd:ee:ff | john123 | 1801 | |
| 2001 | 11:22:cc:ee:ff:gg | dayna83 | 1802 | |
| 2001 | 22:33:de:fg:ec:12 | dayna83 | 1802 | |
| ... | ... | ... | ... | |
| 2008 | ab:cd:ef:12:34:56 | hobson88 | 1810 | |
| ... | ... | ... | ... | |
| 2068 | nil | nil | 1868 | 410 |

FIGURE 4

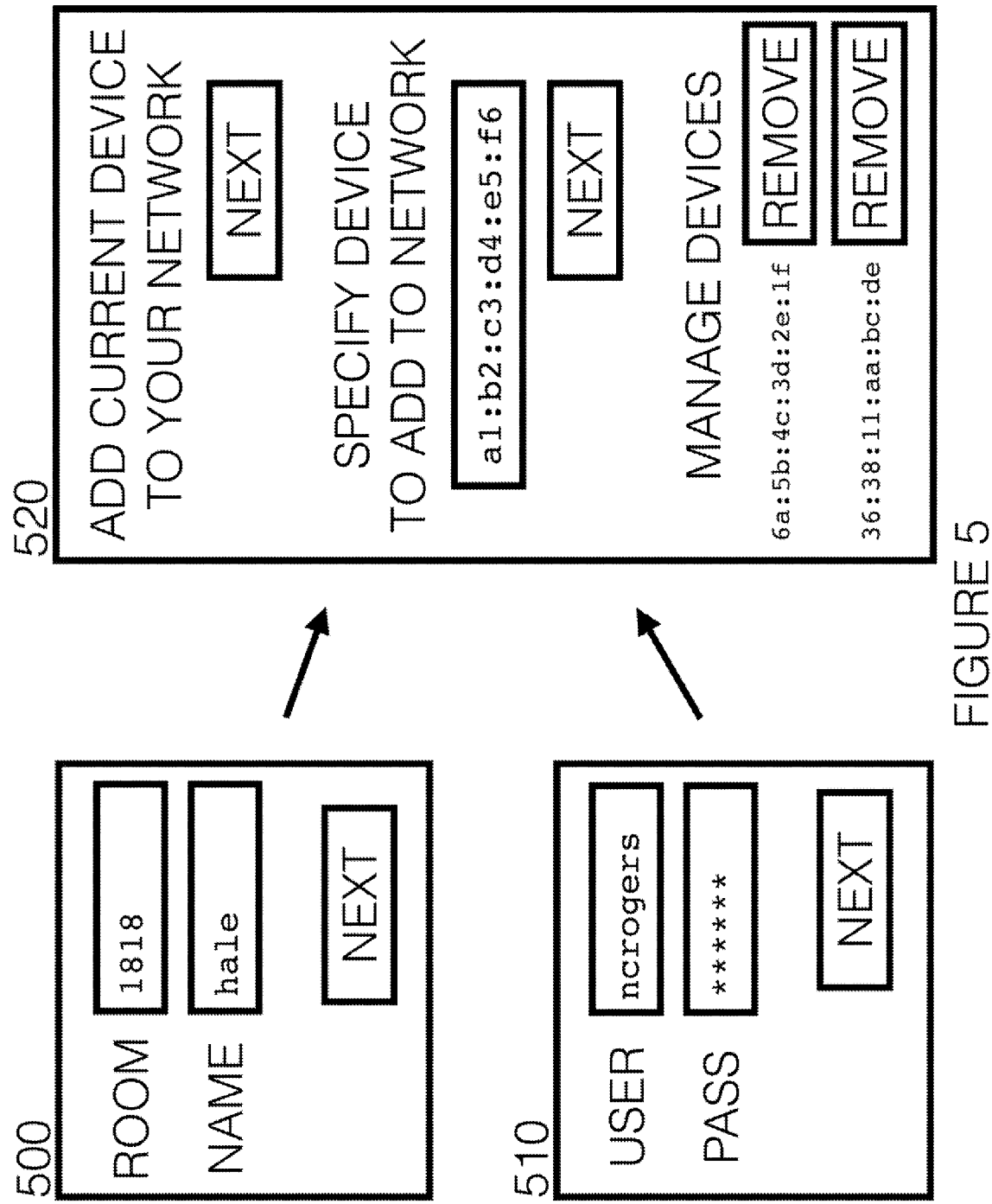

SYSTEM AND METHOD FOR DYNAMIC VLAN ASSIGNMENT

TECHNICAL FIELD

This invention relates to implementing dynamic virtual local area network (VLAN) assignment and provisioning in communication networks.

BACKGROUND

An Internet service provider (ISP) provides network connectivity based on the needs of the clients. For a shared property, such as a multiple dwelling unit (MDU), an office building or a hotel with N units, common ISP deployments include the single demarc approach, distributed demarc approach, and the specific configuration approach. However, these approaches are often too restrictive, too unsecure, or too resource intensive for every situation.

The single demarc approach is when the ISP deploys a single, unified infrastructure to provide connectivity to the entire shared property. A single ISP demarc is present at a central location on the property. All of the units share the distribution infrastructure below the demarc to gain access to the Internet. This approach is most commonly found in hotels. Uplink media conversion is present at a central location on the property. A single, shared gateway is deployed south of the demarc and media conversion. Ethernet is then used to bring connectivity to the various parts of the property. Wireless access points are usually a part of the access infrastructure and often share the wired Ethernet distribution.

The single demarc usually means that provisioning a unit is relatively easy. This is because the distribution infrastructure remains static despite the subscription rollover. This ease of deployment comes with a price. Most shared distribution infrastructures allow every device to see every other devices' unsecure traffic by default. Alternatively some kind of link layer security can be enabled in an attempt to provide individual device isolation. The latter tends to prevent obvious forms of cross device communication (e.g., prevents network printing) but usually fails to address serious issues such as traffic sniffing. Furthermore per-device link level isolation mechanisms will disable Apple mDNS, Microsoft LLMNR and other such mechanisms. Enterprise, corporate and campus networks often use VLANs to deploy multiple layer 2 (L2) separated networks using a single physical Ethernet infrastructure. The networks are usually assigned to organizational groups (e.g., engineering, accounting, operations, etc.). VLANs can be applied to the single demarc approach for ISP deployments in MDUs, office buildings and hotels on a per-unit basis.

The distributed demarc approach involves the ISP placing the demarc within each individual unit. If the property is an MDU then this typically results in a residential gateway with media converter being deployed within each housing unit. If the property is a shared office building then a business router with media converter is typically deployed inside each office. Two common implementations of the distributed demarc approach involve the use of cable or DSL infrastructure within the property. The CMTS or DSLAM headend equipment is typically located on the property or in nearby coax, copper, or fiber cables running between the headend and each unit. Cable or DSL modems are present in each unit and act as the residential gateways which have integrated NAT routing, often with integrated wireless as well. Each unit on the property is treated in the same manner as if they were separate properties. The residential gateways have DHCP and NAT routing so the devices in each unit are all a privately addressed subnet.

The key benefit to the distributed demarc approach is per-unit isolation. The residential gateways and business routers provide each unit with their own private network. There is little possibility of the traffic from one unit accidentally or purposefully being accessed from a different unit. Furthermore traffic within the same unit is fully accessible by all devices within the unit thereby enabling the use of broadcast and multicast based protocols such as Apple's mDNS (aka Bonjour) and Microsoft's LLMNR for local device discovery. The key disadvantage of the distributed demarc approach is the time and cost associated with bringing a customer unit onboard. Residential gateways and business routers are typically installed when a unit is brought online and removed when the subscriber leaves the unit. This process usually involves a costly truck roll. Furthermore the subscriber must wait for the truck roll to occur before Internet access is provisioned. The subscriber anxiety generated by the process results in measurable dissatisfaction in quality surveys. Additionally, implementing a distributed demarc network can lead to performance degradation due to the wireless interference from each unit having separate wireless infrastructure.

A best of both worlds scenario results if a unique VLAN is assigned to each unit. A single demarc with shared distribution infrastructure enables simple physical layer subscriber on-boarding. The VLANs allow each unit to have its own private network, thus enabling the operation of Apple mDNS, Microsoft LLMNR and other communication between devices in the same unit. The unique VLAN for each unit blocks all cross-unit traffic which also defends against sniffing and other malicious behavior.

The provisioning of a unique VLAN per unit is a practice that is used in small and medium scale ISP deployments with a closed distribution fabric. Examples of closed distribution fabrics include fully wired infrastructures as well as combinations of wired and point-to-point and point-to-multipoint wireless infrastructures. Closed distribution fabrics exclude any kind of Wi-Fi that has open SSIDs. The ISP keeps track of VLAN assignments on a back office system (sometimes as simple as a list on a spreadsheet) and then manually provisions VLANs on the distribution infrastructure and gateway.

This approach is easily applied to shared properties (e.g., the MDU, office building and hotel scenarios) when there is no Wi-Fi component. For example, in an office building with N units, if a wired distribution infrastructure is deployed such that each of the N units has its own independent wired Ethernet termination point, then a static VLAN assignment may be made on a per-switchport basis when the distribution network is installed.

Extending the per-unit VLAN approach either to an entirely wireless network or to a Wi-Fi component of a wired and wireless infrastructure network is difficult. Most forms of isolation for Wi-Fi networks are only able to isolate on a per-device basis. The Wi-Fi infrastructure must recognize which wireless nodes belong in which group in order to do logical separation of device groups. In such an infrastructure, units may be logically configured as groups.

It is possible to manually configure multiple SSIDs or create MAC address lists within the wireless infrastructure equipment to provide isolation within a single SSID on a small scale. Large scale per-group isolation on Wi-Fi is almost universally accomplished via dynamic VLAN assigned by a RADIUS server. The device to group mapping must still be manually entered into the RADIUS server but this is usually less onerous than trying to manage multiple SSIDs and/or MAC lists within the Wi-Fi equipment itself.

A single entity operating its own network can easily deploy a Wi-Fi infrastructure using dynamic VLAN assignment with a RADIUS server when the IT personnel have knowledge regarding the set of all devices that will be allowed onto the network. If the set of devices is unavailable ahead of time then the IT personnel will certainly be in touch with people who wish to access the network. The exact opposite is true in a shared property scenario. None of the devices are known ahead of time and the ISP does not want to be in touch with customers every time there is a device change.

For the foregoing reasons, there is a need for a system that enables a service provider to deploy a network using the per-unit VLAN approach on a shared property with zero operator intervention.

SUMMARY

The present invention is directed to a system that enables a service provider to deploy a network using the per-unit VLAN approach on a shared property with zero operator intervention provisioning. The set of all possible VLAN assignments is communicated to the system in the form of a configuration file or graphical user interface settings at the time of installation. The system maintains a mapping between device identifiers, such as MAC addresses, and units, as well as VLANs, wherein the VLANs may be secondary and are often dynamic Access to the set of all MAC addresses present on the distribution network is achieved in the example embodiment by deploying the system as the default gateway, wherein the gateway includes the DHCP server. The system then interacts with both wireline and wireless distribution infrastructure to set VLAN assignments for devices. The RADIUS protocol is used in the example embodiment to make VLAN assignments on the distribution network. The system includes an end-user self-service portal that enables end-users to add and remove devices from their private network thus defining the unit infrastructure. In the example embodiment, the system is the default gateway and forced browser redirect is used to bring devices that do not have an existing VLAN mapping to the self-service portal. The end-user then interacts with the self-service portal to create a VLAN mapping for the device. In the example embodiment, the end-user may choose to add a new device to their unit by providing credentials via a browser-enabled device or by providing the MAC address of a wireless device via a different browser-enabled device.

Basic Architecture

The basic architecture of the system is that of a hub and spokes. The hub of the system is the VLAN to device mapping. It is the VLAN to device mapping which enables the distribution infrastructure to be configured to enable private VLANs for each end-user, residence, hotel room, office or whatever unit of the shared property that is being delivered service. The spokes are the various items that read and write to the VLAN mapping. These include the various mechanisms described above, including but not limited to the self-service portal that changes the mapping due to user interaction, the gateway and/or DHCP server instrumentation that changes the mapping when devices connect and disconnect from the distribution network, the RADIUS server for communicating with the distribution infrastructure. The example embodiment incorporates additional spoke modules that include mechanisms to monitor entries, prune orphans and prioritize reuse of VLANs in the mapping to maintain performance standards, prevent memory overruns and maximize compatibility.

VLAN Change Mechanism

The system also incorporates a specific mechanism to deal with the need to change the VLAN of a device in real time. All distribution infrastructures have some form of VLAN assignment caching. The special VLAN change mechanism is required to inform the distribution infrastructure that the current VLAN assignment is invalid and thus the cached VLAN assignment for the device must be flushed. The most common occurrence of a VLAN assignment change is during the initial provisioning of devices. The example embodiment enables the operator to choose where to place devices that have no VLAN assignment. Typically the operator will choose to assign an unused VLAN to a device that has never been seen before. Once the end-user adds the new device to their private network (unit) then the existing VLAN assignment will become invalid. Thus it is necessary to tell the distribution infrastructure that the current VLAN is invalid so that the device will then be placed into the correct VLAN corresponding to the VLAN of the end-user's private network. The example embodiment incorporates a pluggable mechanism that enables flexible implementation of the invalidation messaging. Example embodiments of the invalidation mechanism include but are not limited to SSH and telnet connections to the CLI of the distribution infrastructure, RADIUS CoA messages as well as vendor specific HTTP/XML APIs.

Database

The example embodiment also incorporates optional integration with external property unit lists and credential databases. The external credentials are often a list of names and passwords or names and room numbers. The unit list is usually a list of available units on the property such as the list of all rooms at a hotel, all residences in a MDU or all office spaces in a shared office complex. In most cases the credentials and the property information is stored in the same database. In some cases, especially those that involve wireline and wireless integration, the unit list may determine the VLAN assignment for a particular unit. For example, if the wired network is setup such that the wired port or ports physically terminating in a room N are on VLAN P then the wireless users who authenticate to room N must also be placed into VLAN P. The example embodiment uses a pluggable architecture to support a plurality of integrations with third-party credential databases and unit lists. Common integration protocols include, but are not limited to Micros Opera FIAS, LDAP, HTNG and RADIUS.

VLAN Assignment

When no a-priori unit to VLAN mapping is in place (such as ones that involve databases, which include external property management system integration) then the system utilizes a unique algorithm for VLAN assignment, reassignment and reuse. When no VLANs have ever been assigned before then the system uses a simple top of the list assignment mechanism that usually results in assignment in a numerical order. When all VLANs have been used at least once then the system assigns VLANs by picking the ones that have been on the free list the longest. However the system also keeps a history of devices. Even if a device no longer has a current VLAN mapping it still has the history to draw from. If the system has seen a device before and it does not have a current mapping then the system will try to assign the same VLAN it was assigned previously if that VLAN is still available. The reason for this is because there is a static VLAN to IP address range mapping and most client operating systems such as Microsoft Windows try to use their last known good DHCP lease upon connecting to the same SSID. By reassigning the same VLAN that was previously assigned to a device, both the reliability and time needed to reconnect is dramatically reduced. Furthermore the system may choose to dynamically extend current VLAN assignments for devices that reappear often when the VLAN consumption is considered reasonable.

Present embodiments combine the dynamic device to VLAN mapping hub with the plurality of spokes that include the self-service portal, the multiple mechanisms that interact with the distribution infrastructure, the instrumentation to detect the coming and going of devices, the interaction with databases and the unique algorithms developed for VLAN assignments. The result is a reliable, secure, high performance and low support volume mechanism that allows service providers to affordably deploy dynamic per-unit VLAN assignment with zero operator intervention provisioning. This overcomes the problems discussed in the Background section and enables operators to have the best of both worlds scenario.

BRIEF DESCRIPTION OF DRAWINGS

FIG. 4 shows an embodiment of the VLAN to device mapping tables stored in the database; and FIG. 5 shows an embodiment of a self-service portal for automatic interactions with a device.

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

It will be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
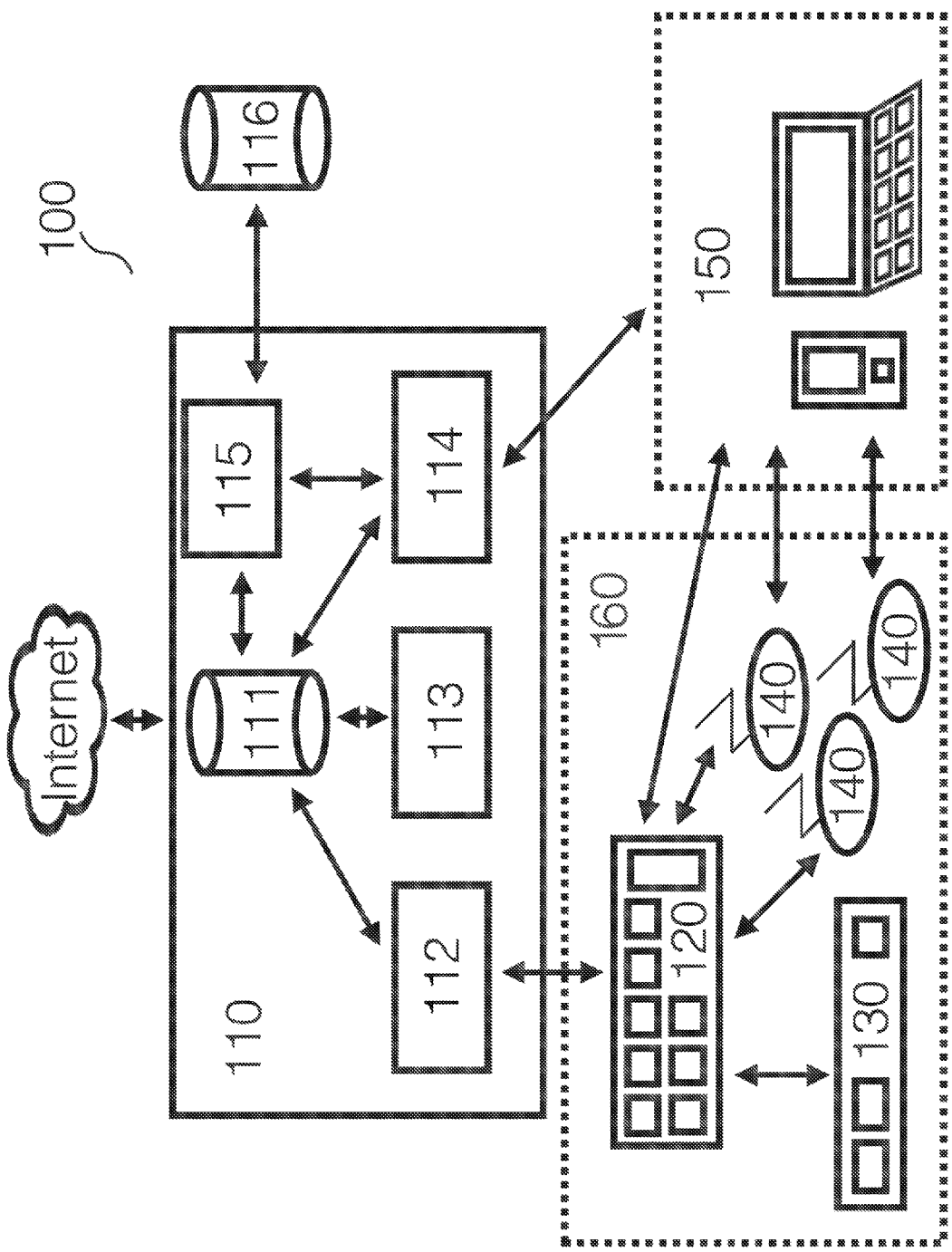
FIG. 1 is a system diagram of an exemplary environment in which the present invention may be implemented.

FIG. 1 depicts an example of a system 100 in which automatic VLAN assignment for Multiple Dwelling Units (MDUs) may be implemented. In some embodiments, the system 100 includes a gateway device 110, switch 120, controller 130, access points (APs) 140, and client devices 150. The gateway device 110 maintains the VLAN mapping tables, including VLAN assignment, re-assignment, and purging. The switch 120 regulates the flow of data based on the VLAN assignments and connection method of the devices. The controller 130 keeps track of which client devices 150 are connected to which AP 140.

The gateway device 110 controls client device access to data sent across a network through VLAN to device mapping. This VLAN to device mapping enables the distribution infrastructure to be configured to enable private VLANs for each client, whether it be for a residence, hotel room, office or unit of the shared property that is being delivered service.

The gateway device 110 comprises a database 111 for VLAN mapping to devices to manage client device 150 connections in the system 100 so that the client device 150 connects to the proper VLAN no matter what AP 140 is accessed in the system 100. The gateway device 110 may comprise a translator 112 to communicate VLAN mapping information to the distribution infrastructure 160 in a mutually agreed protocol. For example, a mutually agreed protocol may be the RADIUS protocol for VLAN assignment and SSH and/or telnet and/or RADIUS CoA for VLAN invalidation. The gateway device 110 may also comprise a daemon 113 to manage VLAN mapping housekeeping, which includes but is not limited to pruning orphaned entries, deleting expired entries, marking frequently used entries and devices, instrumenting utilization periods to optimize adjustments, as well as interacting with the ARP and DHCP tables to detect devices. The gateway device 110 may also comprise an external credential database connector 115 that can interact with external databases 116 for the purpose of dealing with self-service portal credentials as well as manipulating the device to VLAN mapping to work with preconfigured static ports on the wired distribution infrastructure 160 that correspond to specific units. The gateway device 110 may also comprise a self-service portal module 114. The self-service portal 114 modifies the device to VLAN mapping based on authorized web transactions executed by end-users.

The switch directs the information through the system 100. The controller 130 is a device coupled to the switch and capable of controlling multiple APs 140. The controller 130 may be, by way of example but not limitation, a Ruckus ZoneDirector. In some embodiments, the controller 130 and the switch 120 may include common components, or could be a single physical or logical device.

In operation, the controller 130 controls the flow of information to the APs 140 and to the client devices 150. The controller 130 communicates with the gateway device 110 to determine the flow of information so that devices on the same VLAN may see and communicate with each other without other client devices receiving those communications.

The APs 140 are stations that link client devices to the network infrastructure 160. In some embodiments, the APs 140 are hardware units that act as a communication hub by linking wireless mobile 802.11 stations to a wired backbone network. In some embodiments, the APs 140 connect users to other devices within the network that are connected to the same VLAN. The number of devices and size of a network help to determine how many APs 140 are desirable for a given implementation. In some embodiments, the APs 140 provide both wired and wireless connections.

Systems, apparatus, and methods described herein may be implemented using digital circuitry, or using one or more computers using well known computer processors, memory units, storage devices, computer software, and other components. Typically, a computer includes a processor for executing instructions and one or more memories for storing instructions and data. A computer may also include, or be coupled to, one or more storage devices, such as one or more magnetic disks, internal hard disks and removable disks, optical disks, etc.

Figure 2:
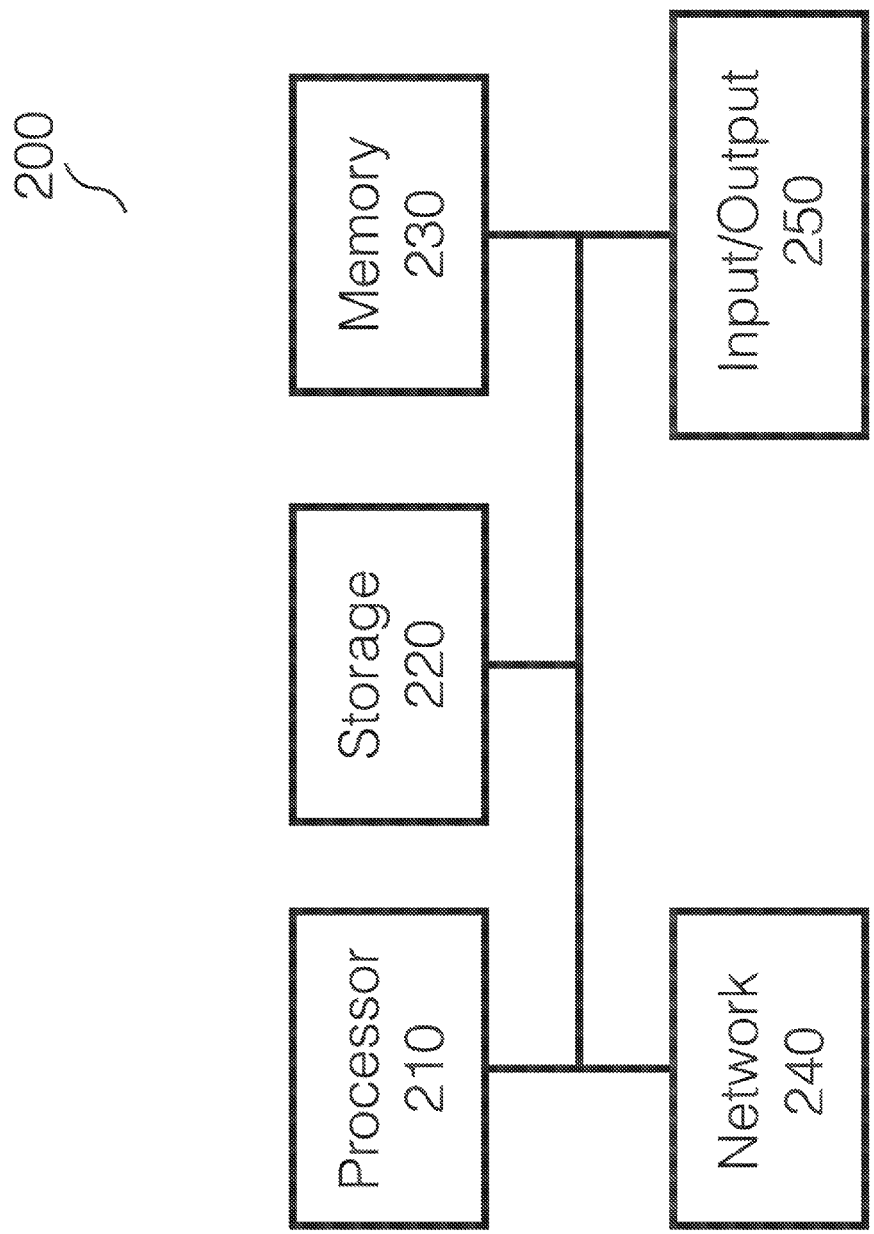
FIG. 2 shows a high-level diagram of hardware that may be used to implement various aspects of the present invention in certain embodiments.

A high-level block diagram of an exemplary computer 200 that may be used to implement systems, apparatus, and methods described herein is illustrated in FIG. 2. For example, the gateway device for VLAN mapping may be implemented by such an exemplary computer. The computer 200 comprises a processor 210 operatively coupled to a data storage device and memory. Processor 210 controls the overall operation of computer 200 by executing computer program instructions that define such operations. The computer program instructions may be stored in data storage device 220, or other non-transitory computer readable medium, and loaded into memory 230 when execution of the computer program instructions is desired. Thus, the modules described for VLAN mapping, housekeeping, and other functions can be defined by the computer program instructions stored in memory 230 and/or data storage device 220 and controlled by processor 210 executing the computer program instructions.

Computer 200 includes one or more network interfaces 240 for communicating with other devices via a network. Computer 200 may also include one or more input/output devices 250 that enable user interaction with computer 200 (e.g., display, keyboard, touchpad, mouse, speakers, buttons, etc.).

Processor 210 can include, among others, special purpose processors with software instructions incorporated in the processor design and general purpose processors with instructions in storage device 220 or memory 230, to control the processor 210, and may be the sole processor or one of multiple processors of computer 200. Processor 210 may be a self-contained computing system, containing multiple cores or processors, a bus, memory controller, cache, etc. A multi-core processor may be symmetric or asymmetric. Processor 210, data storage device 220, and/or memory 230 may include, be supplemented by, or incorporated in, one or more application-specific integrated circuits (ASICs) and/or one or more field programmable gate arrays (FPGAs). It can be appreciated that the disclosure may operate on a computer 200 with one or more processors 210 or on a group or cluster of computers networked together to provide greater processing capability.

Data storage device 220 and memory 230 each comprise a tangible non-transitory computer readable storage medium. By way of example, and not limitation, such non-transitory computer-readable storage medium can include random access memory (RAM), high-speed random access memory (DRAM), static random access memory (SRAM), double data rate synchronous dynamic random access memory (DDRRAM), read-only memory (ROM), erasable programmable read-only memory (EPROM), electrically erasable programmable read-only memory (EEPROM), flash memory, compact disc read-only memory (CD-ROM), digital versatile disc read-only memory (DVD-ROM) disks, or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Network/communication interface 240 enables the computer 200 to communicate with networks, such as the Internet, also referred to as the World Wide Web (WWW), an intranet and/or a wireless network, such as a cellular telephone network, a wireless local area network (LAN) and/or a metropolitan area network (MAN), and other devices using any suitable communications standards, protocols, and technologies. By way of example, and not limitation, such suitable communications standards, protocols, and technologies can include Ethernet, Wi-Fi (e.g., IEEE 802.11), Wi-MAX (e.g., IEEE 802.16), VLAN (e.g., IEEE 802.1Q), Bluetooth, near field communications ("NFC"), radio frequency systems, infrared, GSM, EDGE, HS-DPA, CDMA, TDMA, quadband, VoIP, IMAP, POP, XMPP, SIMPLE, IMPS, SMS, or any other suitable communications protocols. By way of example, and not limitation, the network interface 240 enables the computer 200 to transfer data, synchronize information, update software, or any other suitable operation.

Input/output devices 250 may include peripherals, such as a printer, scanner, monitor, etc. Input/output devices 250 may also include parts of a computing device. In some embodiments, the computer 200 acts as a headless server computer without input/output devices 250.

Any or all of the systems and apparatus discussed herein, including personal computers, tablet computers, hand-held devices, cellular telephones, servers, database, cloud-computing environments, virtual compute environment and components thereof, may be implemented using a computer such as computer 200.

An implementation of an actual computer or computer system may have other structures and may contain other components as well, and that FIG. 2 is a high level representation of some of the components of such a computer for illustrative purposes.

Figure 3:
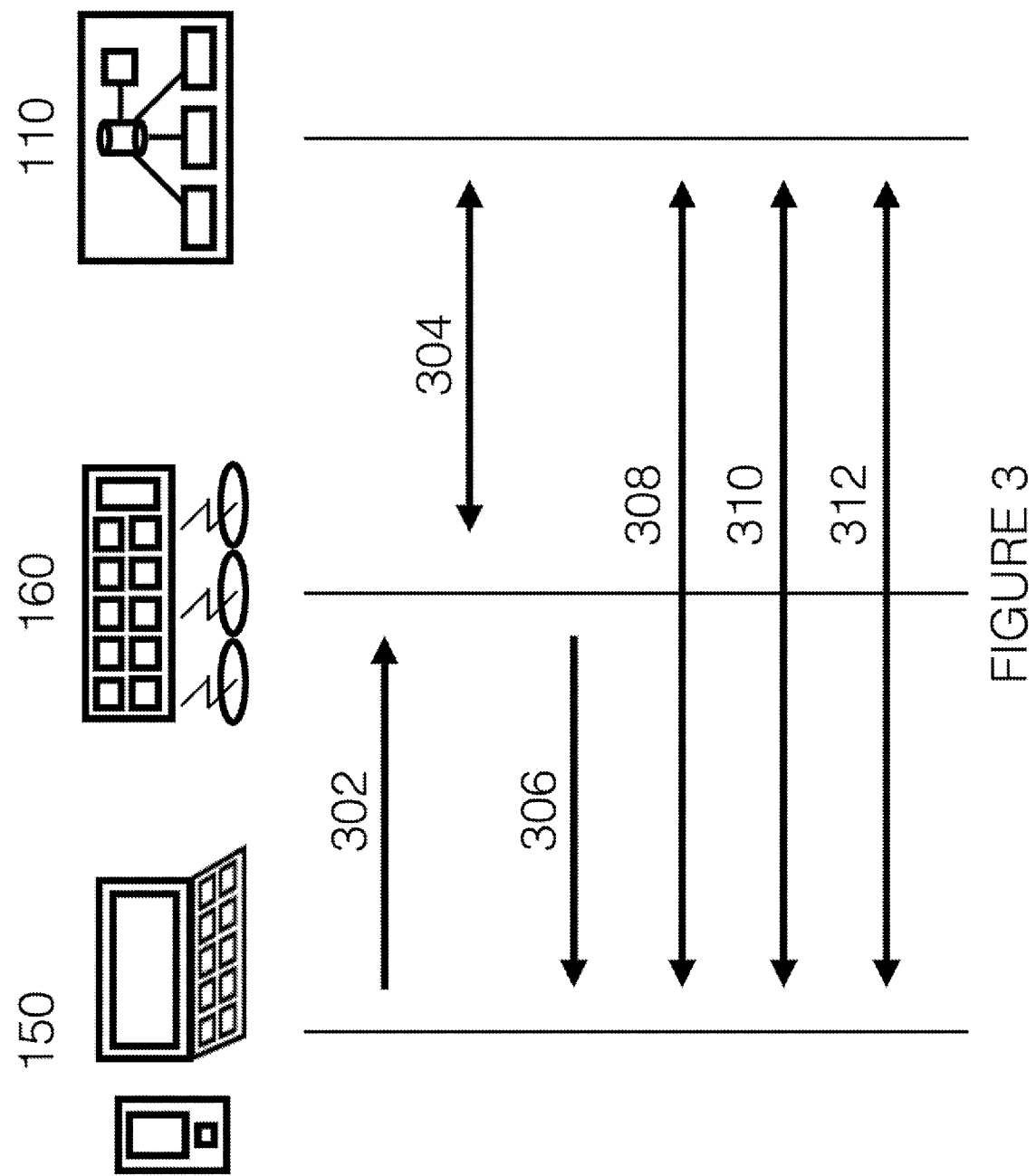
FIG. 3 shows an exemplary call diagram of a process in accordance with an embodiment of the present invention.

FIG. 3 shows an embodiment of a messaging sequence between client devices 150, the distribution infrastructure 160, and the gateway device 110 for automatic VLAN assignment and re-assignment. Client devices 150 connect to the network in step 302 by physically jacking into wireline Ethernet or associating to a wireless SSID. The distribution infrastructure 160 then interacts with the gateway device 110 and gathers a VLAN assignment in step 304. In the example embodiment, the device to VLAN mapping is retrieved from the invention by the distribution infrastructure 160 through RADIUS messaging. Once the distribution infrastructure 160 receives a VLAN assignment from the gateway device 110, the distribution infrastructure 160 will bring the physical layer of the connection up in step 306 and the client device 150 will then be ready for L2 initialization. The client device 150 then sends a DHCP request in step 308 that is responded to by the DHCP server within the gateway device 110. If the client device 150 has never been seen before, the gateway device 110 will assign an IP block that will bring the device to a self-service portal. This results in web requests in step 310 from the client device 150 being redirected to the self-service portal module. The client then interacts with the self-service portal in step 312 to acquire the proper access for their client device. In some embodiments, payment is required to proceed. In some embodiments, the VLAN assignment(s) may change.

FIG. 4 demonstrates an example embodiment of a device to VLAN mapping table 400 stored in the database 111. In this embodiment, VLANs 402 are identified by their VLAN tag. Devices are identified by their MAC address 404. Accounts 406 are represented by foreign key relations to the Account database table. Additional information may also be included for reference or administrative purposes. For example, the table in FIG. 4 also includes references to property units 408. In some embodiments, the VLAN to device mapping table also includes facilities for static VLAN port mappings in the wireline infrastructure that is supported by nil entries 410.

FIG. 5 is an example of a self-service portal 114. The operator may choose to have the end-user credentials take the form of room numbers and names 500 when property management system integration is enabled in the example embodiment. Alternatively the operator may choose to have credentials in the form of usernames and passwords 510 or in some cases just usernames with blank passwords or no password field. End-users who supply valid credentials are brought to a management page 520 where they are able to add the current device, add a different device (specified by MAC address) or remove existing devices from their private network.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A system for dynamic VLAN assignment, the system comprising:
   a. at least one processor;
   b. memory; and
   c. at least one program, wherein the at least one program is stored in the memory and configured to be executed by the at least one processor, the at least one program including instructions to:
      i. initialize and maintain a VLAN to device mapping table stored in a database;
      ii. receive a connection to a client device with client device identifying information through a network infrastructure;
      iii. if the client device identifying information is not stored in the VLAN to device mapping table in the database, automatically assign a first VLAN assignment to the client device and store the first VLAN assignment and client device identifying information in the database;
      iv. send the first VLAN assignment to the client device;
      v. receive and respond to a DHCP request from the client device;
      vi. receive a web request from the client device;
      vii. if the client device has not been registered, redirect the client device to a self-service portal to register;
      viii. receive registration information from client device; and
      ix. if the registration information is associated with a second VLAN assignment, replace the first VLAN assignment with the second VLAN assignment.

2. The system of claim 1, wherein the at least one program further comprises instructions to monitor VLAN entries and prune unused VLAN assignments.

3. The system of claim 2, further comprising a second database, wherein the second database comprises a unit list of a multiple dwelling unit property and associated credentials, wherein the at least one program further comprises instructions to compare the registration information from the client device to the second database for validation.

4. The system of claim 3, wherein the client device identifying information is a MAC address.

5. The system of claim 4, wherein the at least one program further comprises instructions to invalidate the first VLAN assignment.

6. The system of claim 5, wherein the first VLAN assignment is determined by choosing from a plurality of VLAN assignments a VLAN assignment that has not been in use the longest.

7. The system of claim 6, wherein the at least one program further comprises instructions to reduce a likelihood of overwriting a VLAN assignment for client devices that reappear.

8. A method for dynamic VLAN assignment, the method comprising:
   a. initializing and maintaining a VLAN to device mapping table stored in a database;
   b. receiving a connection to a client device with client device identifying information through a network infrastructure;
   c. if the client device identifying information is not stored in the VLAN to device mapping table in the database, automatically assigning a first VLAN assignment to the client device and storing the first VLAN assignment and the client device identifying information in the database;
   d. sending the first VLAN assignment to the client device;
   e. receiving and responding to a DHCP request from the client device;
   f. receiving a web request from the client device;
   g. if the client device has not been registered, redirecting the client device to a self-service portal to register;
   h. receiving registration information from client device; and
   i. if the registration information is associated with a second VLAN assignment, replacing the first VLAN assignment with the second VLAN assignment.

9. The method of claim 8, further comprising monitoring VLAN entries and pruning unused VLAN assignments.

10. The method of claim 9, further comprising comparing the registration information from the client device to a second database for validation, wherein the second database comprises a unit list of a multiple dwelling unit property and associated credentials.

11. The method of claim 10, wherein the client device identifying information is a MAC address.

12. The method of claim 11, further comprising invalidating the first VLAN assignment before assigning the second VLAN assignment.

13. The method of claim 12, wherein automatically assigning a first VLAN assignment comprises assigning from a plurality of VLAN assignments a VLAN assignment that has not been in use the longest.

14. The method of claim 13, further comprising monitoring client devices and reducing a likelihood of overwriting a VLAN assignment for client devices that reappear.

15. A non-transitory computer readable storage medium having stored therein instructions, which when executed by a computing device, cause the computing device to:

a. maintain a VLAN to device mapping table stored in a database;
b. receive a connection to a client device with client device identifying information through a network infrastructure;
c. if the client device identifying information is not stored in the VLAN to device mapping table in the database, automatically assign a first VLAN assignment to the client device and storing the first VLAN assignment and the client device identifying information in the database;
d. send the first VLAN assignment to the client device;
e. receive and respond to a DHCP request from the client device;
f. receive a web request from the client device;
g. if the client device has not been registered, redirect the client device to a self-service portal to register;
h. receive registration information from client device; and
i. if the registration information is associated with a second VLAN assignment, replace the first VLAN assignment with the second VLAN assignment.

16. The non-transitory computer readable storage medium of claim 15, further comprising instructions to monitor VLAN entries and prune unused VLAN assignments.

17. The non-transitory computer readable storage medium of claim 16, further comprising instructions to compare the registration information from the client device to a second database for validation, wherein the second database comprises a unit list of a multiple dwelling unit property and associated credentials.

18. The non-transitory computer readable storage medium of claim 17, wherein the client device identifying information is a MAC address.

19. The non-transitory computer readable storage medium of claim 18, further comprising instructions to invalidate the first VLAN assignment before assigning the second VLAN assignment.

20. The non-transitory computer readable storage medium of claim 19, wherein an instruction to automatically assign a first VLAN assignment comprises instructions to assign from a plurality of VLAN assignments a VLAN assignment that has not been in use the longest.

\* \* \* \* \*

UNITED STATES PATENT AND TRADEMARK OFFICE
CERTIFICATE OF CORRECTION

PATENT NO. : 9,025,533 B1
APPLICATION NO. : 14/500011
DATED : May 5, 2015
INVENTOR(S) : Simon C. Lok, Nicholas C. Rogers and Darrian Hale Page 1 of 1

It is certified that error appears in the above-identified patent and that said Letters Patent is hereby corrected as shown below:

In the Claims

Column 9, line 52 In claim 1 line 15: "iv. send the first VLAN assignment to the client device" has been changed to "iv. send the first VLAN assignment to the network infrastructure".

Column 10, line 32 In claim 8 line 10: "d. sending the first VLAN assignment to the client device" has been changed to "d. sending the first VLAN assignment to the network infrastructure".

Column 11, line 7 In claim 15 line 10: "d. send the first VLAN assignment to the client device" has been changed to "d. send the first VLAN assignment to the network infrastructure".

Signed and Sealed this
Twenty-first Day of June, 2016

Michelle K. Lee
*Director of the United States Patent and Trademark Office*